B. F. SEE.
Bee Hive.
No. 86,037.  Patented Jan'y 19, 1869.
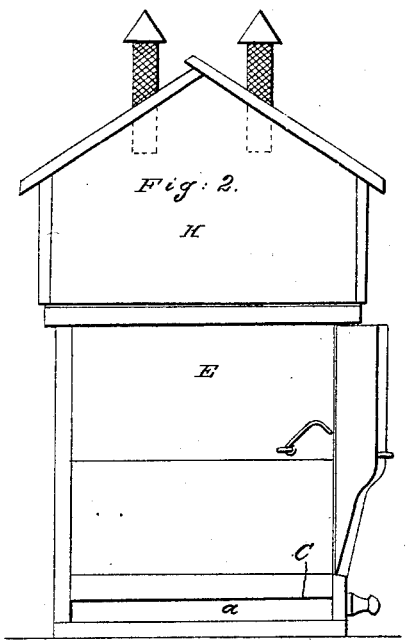
Fig. 2.
Fig. 1.
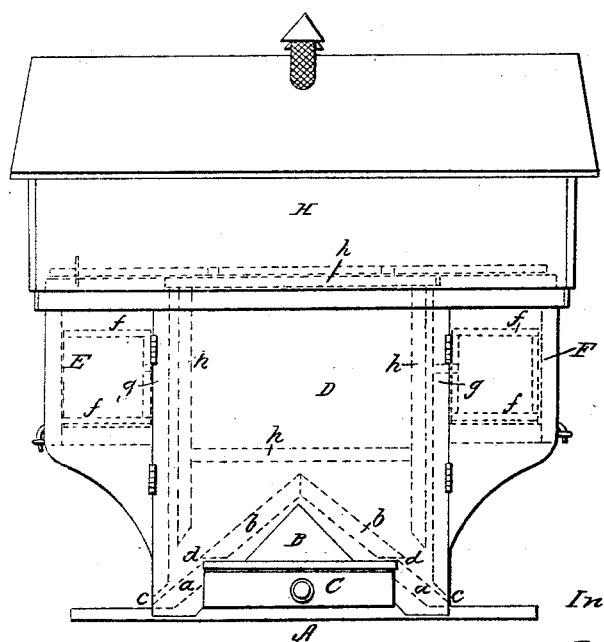
Witnesses:
S. E. Peck.
M. A. C. Peck.
Inventor:
B. F. Lee.
by his atty
H. P. K. Peck.

B. F. SEE, OF MONROE, OHIO.

Letters Patent No. 86,037, dated January 19, 1869.

IMPROVEMENT IN BEE-HIVES.

The Schedule referred to in these Letters Patent and making part of the same.

*To all whom it may concern:*

Be it known that I, B. F. SEE, of Monroe, in the county of Butler, in the State of Ohio, have invented certain new and useful Improvements in Bee-Hives; and I do hereby declare that the following is a full and exact description thereof, reference being had to the accompanying drawings, and to the letters of reference marked thereon.

Figure 1 represents the front of my new bee-hive, and

Figure 2 represents an end view of the same.

In fig. 1, the red lines indicate the internal construction of the hive.

The central portion of the hive is a box of rectangular form, resting upon the platform A, to which it is fastened.

The red lines *a b* indicate four inclined boards, which extend entirely across the hive, upon which the bees may ascend when they enter the hive, through narrow slots formed for the purpose, seen at *c*.

The upper surfaces of the boards *b* are situated at an elevation above the inclined plane occupied by the boards *a*, and a slot, *d*, is formed between these boards, for the entrance of insects, such as habitually infest bees.

The lower portion of the space at the bottom of the hive, formed by the boards *a b* and base or platform A, is an apartment designed to receive the moths and millers which will naturally enter the narrow opening *d*.

This apartment is provided with a window, B, and a drawer, C, the latter being lined with zinc, to retain water, or other suitable liquid, to entice the insects to enter, and as the insects attempt to escape through the window B, they will fall into the water, or other liquid in drawer C, and perish.

Extending across each end of the rectangular box D, I have formed two apartments, E F, having doors *e e* in front, and in these apartments a suitable removable cap or box is inserted, as indicated by the red lines *f f*.

These side apartments are enclosed, excepting the small aperture for the entrance of the bees, seen in red lines at *g g*.

The superstructure H, which fits over the parts already described, is of sufficient capacity to receive a number of boxes, in which the bees may work.

The central portion of the hive D communicates with the chamber above it, and a series of frames, represented in red lines *h h*, is suspended, as represented in fig. 1.

A removable partition, having two slots formed in it, for the passage of the bees, may be employed to cover the entire upper surface of the apartments D E F, and this partition or diaphragm can be removed during the winter, to afford the appropriate space for the bees in the central portion of the hive.

To provide for ventilation at the top, two perforated chimneys are inserted through the roof, as represented.

For wintering bees, my hive will be adjusted and arranged in the following manner, to wit:

All the boxes occupying the chamber H, and those occupying the two apartments E F, may be removed, as well as the diaphragm *m* and several of the frames *h*, which will be taken out of the centre of the hive; and the apartments E F and chamber H may be filled with any suitable material, which will keep the frost from affecting the bees.

In thus packing the chamber with wool or other material, care must be taken to leave the lower ends of the ventilating-chimneys open; otherwise, the bees will die from suffocation.

When it is necessary to inspect the interior of the bee-hive, the entire chamber H may be removed, as it is retained in its place by resting upon the rabbeted edge of the lower part of the hive.

It will now be seen that my bee-hive combines the advantages due to an efficient moth-trap, a capacious working and storage-room, and is capable of convenient adjustment and arrangement for making a comfortable and warm, as well as well-ventilated central apartment for wintering the bees safely, and in a position adjoining to the depository for the honey.

In cold weather, if the bees have to descend to a distant portion of the hive to feed, they are very liable to perish before they can again return to the mass of bees, where the animal heat generated by the swarm keeps up a proper temperature.

Having fully described my improvements in bee-hives,

What I claim, and desire to secure by Letters Patent, as my invention, is—

1. The construction and arrangement of the moth-trap, by the combination of boards *a b*, drawer C, and window B, when provided with the entrances *c d*, in the manner and for the purpose described.

2. The central hive D, apartments E F, and removable chamber H, in combination with the removable frames and boxes *h f*, when the parts are constructed, arranged, and used in the manner and for the purposes described.

In testimony whereof, I have hereunto set my hand, this 21st day of May, 1868.

B. F. SEE.

Witnesses:
 JOHN McCLELLAN,
 H. P. K. PECK.